United States Patent
Damji et al.

(10) Patent No.: US 9,414,315 B2
(45) Date of Patent: Aug. 9, 2016

(54) REDUCING POWER CONSUMPTION IN CONNECTED MODE DISCONTINUOUS RECEPTION

(71) Applicant: Apple Inc., Cupertino, CA (US)

(72) Inventors: Navid Damji, Cupertino, CA (US); Giri Prassad Deivasigamani, San Jose, CA (US); Johnson O. Sebeni, Fremont, CA (US); Luciano M. Verger, San Jose, CA (US); Madhusudan Chaudhary, Sunnyvale, CA (US); Samy Khay-Ibbat, San Francisco, CA (US); Sarma V. Vangala, San Jose, CA (US); Shivesh Makharia, Santa Clara, CA (US); Sree Ram Kodali, Cupertino, CA (US); Srinivasan Vasudevan, Sunnyvale, CA (US); Thanigaivelu Elangovan, Santa Clara, CA (US); Zhu Ji, San Jose, CA (US)

(73) Assignee: Apple Inc., Cupertino, CA (US)

( * ) Notice: Subject to any disclaimer, the term of this patent is extended or adjusted under 35 U.S.C. 154(b) by 94 days.

(21) Appl. No.: 14/173,478

(22) Filed: Feb. 5, 2014

(65) Prior Publication Data

US 2014/0219151 A1    Aug. 7, 2014

Related U.S. Application Data

(60) Provisional application No. 61/761,192, filed on Feb. 5, 2013.

(51) Int. Cl.
*G08C 17/00* (2006.01)
*H04W 52/02* (2009.01)

(52) U.S. Cl.
CPC ............ *H04W 52/0235* (2013.01); *Y02B 60/50* (2013.01)

(58) Field of Classification Search
CPC .................... H04W 52/0235; H04W 52/0209; Y02B 60/50
USPC ......... 370/414, 416, 418, 447, 461, 462, 311; 340/7.32–7.38; 455/343.1–343.6
See application file for complete search history.

(56) References Cited

U.S. PATENT DOCUMENTS

| | | |
|---|---|---|
| 2009/0046641 A1 | 2/2009 | Wang et al. |
| 2009/0287976 A1 | 11/2009 | Wang et al. |

(Continued)

FOREIGN PATENT DOCUMENTS

| | | |
|---|---|---|
| KR | 1020090029674 | 3/2009 |
| KR | 1020110036518 | 4/2011 |

(Continued)

OTHER PUBLICATIONS

International Search Report and Written Opinion in PCT Application No. PCT/US2014/014780, mailed Oct. 29, 2014, 10 pp.
Taiwanese Patent Application No. 103103825—Office Action dated Jun. 26, 2015.
Korean Patent Application No. 10-2015-7021089—Preliminary Rejection dated Apr. 7, 2016.

*Primary Examiner* — Mang Yeung
(74) *Attorney, Agent, or Firm* — Downy Brand LLP

(57) ABSTRACT

A method for reducing power consumption in connected mode discontinuous reception is disclosed. The method can include a wireless communication device sending a transmission for a pending HARQ retransmission process and receiving an ACK for the transmission. The method can further include the wireless communication device determining a subset of remaining uplink transmission opportunities in the pending HARQ retransmission process to monitor for an uplink grant in response to receiving the ACK and monitoring the subset of remaining uplink transmission opportunities for an uplink grant. The method can additionally include the wireless communication device entering a sleep state for any uplink transmission opportunities remaining in the pending HARQ retransmission process after monitoring the subset of remaining uplink transmission opportunities in an instance in which an uplink grant for the pending HARQ retransmission process is not received for any of the subset of remaining uplink transmission opportunities.

20 Claims, 7 Drawing Sheets

(56) References Cited

U.S. PATENT DOCUMENTS

| | | | |
|---|---|---|---|
| 2010/0097978 A1* | 4/2010 | Palanki et al. | 370/315 |
| 2010/0322173 A1 | 12/2010 | Marinier et al. | |
| 2011/0044196 A1* | 2/2011 | Ishii | H04L 1/1692 370/252 |
| 2012/0157153 A1 | 6/2012 | Song | |
| 2012/0257559 A1* | 10/2012 | Kim | H04W 52/0219 370/311 |
| 2013/0021932 A1 | 1/2013 | Damnjanovic et al. | |
| 2013/0194994 A1* | 8/2013 | Dayal et al. | 370/311 |
| 2014/0064160 A1* | 3/2014 | Verger et al. | 370/311 |

FOREIGN PATENT DOCUMENTS

| | | |
|---|---|---|
| KR | 1020110108261 | 10/2011 |
| KR | 10-2012-00283494 A | 3/2012 |
| KR | 10-2012-0067856 A | 6/2012 |
| KR | 10-2012-0113687 A | 10/2012 |
| WO | WO2012111596 | 8/2012 |

\* cited by examiner

REDUCING POWER CONSUMPTION IN CONNECTED MODE DISCONTINUOUS RECEPTION

CROSS-REFERENCE TO RELATED APPLICATION

This application claims the benefit of priority from U.S. Provisional Patent Application No. 61/761,192, filed on Feb. 5, 2013, which is hereby incorporated herein by reference in its entity.

FIELD

The described embodiments relate generally to wireless communications technology. More particularly, the present embodiments relate to reducing power consumption in connected mode discontinuous reception (DRX).

BACKGROUND

Wireless communication devices continue to evolve at a rapid pace, and now offer users a wide array of capabilities. However, implementation of these new capabilities often results in increased power demand, which can reduce device battery life. As such, device manufacturers and network operators continue to strive to reduce power consumption where possible to increase battery life and improve user experience.

One attempt that has been made to reduce power consumption by a wireless communication device in connected mode is through the implementation of connected mode DRX, which can enable a device to enter a sleep state and wake-up periodically to monitor network activity while in connected mode. However, for wireless communication devices engaging in data transfer for time-sensitive applications, such as voice over Long Term Evolution (VoLTE) sessions, devices are often unable to enter a sleep state even when configured for connected mode DRX due to engagement in retransmission processes that can consume much, if not all, of a DRX cycle. As such, current specifications for connected mode DRX have proven ineffective at reducing power consumption by a device operating in connected mode in many instances.

SUMMARY

Some example embodiments reduce power consumption in connected mode DRX. More particularly, some example embodiments provide a wireless communication device that can be configured to reduce, or otherwise limit the number of monitored uplink transmission opportunities after receiving an acknowledgement (ACK) for a first transmission and/or for a subsequent retransmission. Thus, for example, rather than remaining in an active state and monitoring for receipt of an uplink grant for each uplink transmission opportunity in accordance with a hybrid automatic repeat request (HARM) process and/or other retransmission process that can be used on an uplink, a wireless communication device in accordance with some example embodiments can be configured to selectively monitor a subset of remaining uplink transmission opportunities after receiving an ACK. As such, a duration spent in Active Time by a device configured for connected mode DRX can be reduced and a device can be allowed to enter a sleep state for a longer portion of a DRX cycle, thus providing power savings to the device.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
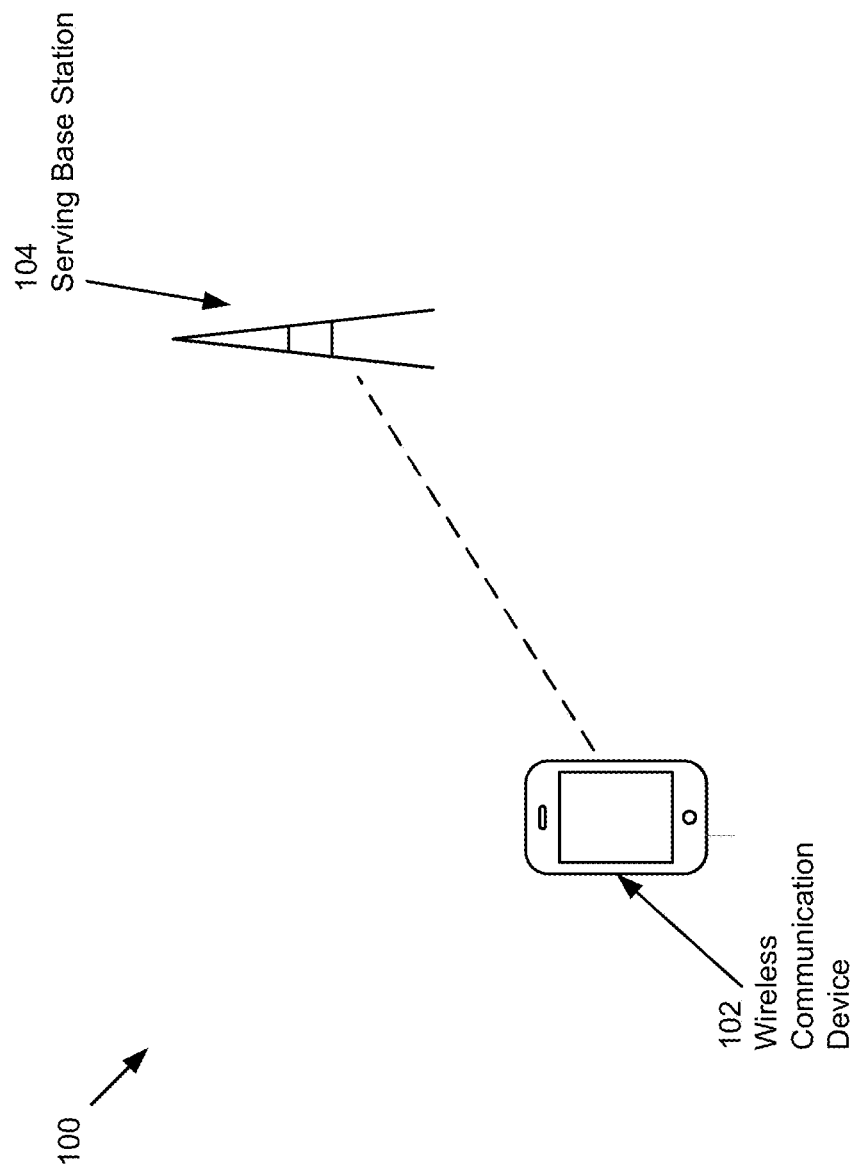
FIG. 1 illustrates a wireless communication system in accordance with some example embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Connected mode DRX for a wireless communication device can be configured by a serving base station, such as an evolved Node B (eNB) on a Long Term Evolution (LTE) network. For example, in some embodiments, a serving base station can configure a connected mode DRX configuration for a wireless communication device based on a type of application being used by the wireless communication device (e.g., based on data traffic characteristics associated with the application) so as to ensure a Quality of Service (QoS) that can be required by the application. The DRX configuration can be defined by a set of parameters, which can include On Duration Timer; drx-InactivityTimer; a DRX cycle length configuration (e.g., either longDRX-Cycle or shortDRX-Cycle); and drx-RetransmissionTimer. In addition, the wireless communication device can be required to be awake during an Active Time, which can, for example, be defined in accordance with Third Generation Partnership Project (3GPP) TS 36.321, Section 5.7 specification. For a voice over LTE (VoLTE) application or other time-sensitive application, the DRX parameters can be configured with a small drx-InactivityTimer, On Duration Timer and DrxCycle length in order to satisfy latency constraints. An example configuration for a time sensitive application can be as follows:

OnDuration: 2 or 4 milliseconds (ms)
drx-InactivityTimer: 2 ms or 4 ms
DRX cycle length: 20 ms or 40 ms A major impact that can result in an extended wake-up timeline for a wireless communication device operating in accordance with short DRX cycle length configurations, such as can be used for VoLTE and/or other time sensitive applications, is a requirement for the wireless communication device to be in Active Time when an uplink (UL) grant for pending Hybrid Automatic Repeat Request (HARQ) retransmission can occur and there is data in the corresponding HARQ buffer, such as described in the 3GPP TS 36.321, Section 5.4 specification. In this regard, the present 3GPP TS 36.321 specification mandates that a wireless communication device keep the data in the HARQ buffer until the Maximum (Max) Number of Possible Transmission Opportunities (Max Number of Transmissions) has occurred. This requirement implies that the wireless communication device would remain in active time for the duration of monitoring possible UL transmission scheduling even if the first (or subsequent retransmissions) are acknowledged (ACKed) by the network. As such, the wireless communication device can remain awake during the DRX cycle period according to the following calculation:

$$\text{Active Duration} = \text{HARQ Round Trip Time(RTT)(e.g., 8 ms)} * \text{Max Number of Transmissions} \quad [1]$$

One typical network configuration for the maximum number of HARQ transmission opportunities is 4. Using equation [1] with an 8 ms HARQ RTT, a configuration for the Max Number of Transmissions of 4 can result in an active duration of 32 ms. An active duration of 32 ms is longer than the short 20 ms DRX cycle and constitutes a significant portion of the longer 40 ms DRX cycle.

Current specifications can require a wireless communication device to continue to monitor several uplink transmission opportunities after receiving an ACK for a transmission. In this regard, while a wireless communication device can receive an ACK, the ACK may not be an actual acknowledgement of receipt of the transmission by the network. For example, in some instances, the network can transmit a negative-acknowledgement (NACK) that can be misinterpreted by the device as an ACK. As a further example in which an ACK received by a wireless communication device may not be an actual acknowledgement of receipt of a transmission, there are instances in which the network can send an ACK even in an instance in which the UL transmission was received in error so as to prevent UL collision of retransmission with an already configured/scheduled transmission of another device/common channel. As such, receipt of an ACK does not guarantee that an UL transmission was successfully received and wireless communication devices are generally configured to continue to monitor uplink transmission opportunities for receipt of an uplink grant for retransmitting the prior transmission even after receiving an ACK. Monitoring these additional uplink transmission opportunities can accordingly result in a wireless communication device remaining awake for at least a significant portion of a DRX cycle, if not for the entire cycle, as described above in accordance with equation [1].

Some example embodiments accordingly provide for reducing, or otherwise limiting the number of monitored uplink transmission opportunities after receiving an ACK for a first transmission and/or for a subsequent retransmission. As such, a duration of Active Time for a device configured for connected mode DRX can be reduced and a device can be allowed to enter a sleep state for a longer portion of a DRX cycle, thus resulting in power savings for the device Some example embodiments reduce power consumption in connected mode DRX. More particularly, some example embodiments provide a wireless communication device that can be configured to reduce, or otherwise limit the number of monitored uplink transmission opportunities after receiving an ACK for a first transmission and/or for a subsequent retransmission. Thus, for example, rather than remaining in an active state and monitoring for receipt of an uplink grant for each uplink transmission opportunity in accordance with a retransmission process, such as a HARQ retransmission process, that can be used on an uplink, a wireless communication device in accordance with some example embodiments can be configured to selectively monitor a subset of remaining uplink transmission opportunities after receiving an ACK. As such, a duration spent in Active Time by a device configured for connected mode DRX can be reduced and a device can be allowed to enter a sleep state for a longer portion of a DRX cycle, thus providing power savings to the device.

These and other embodiments are discussed below with reference to FIGS. 1-7. However, those skilled in the art will readily appreciate that the detailed description given herein with respect to these Figures is for explanatory purposes only and should not be construed as limiting.

FIG. 1 illustrates a wireless communication system 100 in accordance with some example embodiments. The system 100 can include a wireless communication device 102, which can, for example, comprise a cellular phone, such as a smart phone device, a tablet computing device, a laptop computer, or other computing device that can be configured to communicate over a cellular network.

Wireless communication device 102 can be camped on serving base station 104 of a serving cellular network in a connected mode. Serving base station 104 can be any type of cellular base station dependent on a type of radio access technology (RAT) used by the serving cellular network. By way of non-limiting example, the serving base station 104 can be a base station (BS), base transceiver station (BTS), node B, evolved Node B (eNB), some combination thereof, and/or other type of cellular base station. The RAT used by the serving network can be any type of RAT, which can include a connected mode DRX configuration, or the equivalent. By way of non-limiting example, the RAT can be an LTE RAT, such as LTE, LTE-Advanced (LTE-A), or the like. It will be appreciated, that other present or future-developed RATs that can include a connected mode DRX configuration, or the equivalent, can be substituted for LTE within the scope of the disclosure.

Figure 2:
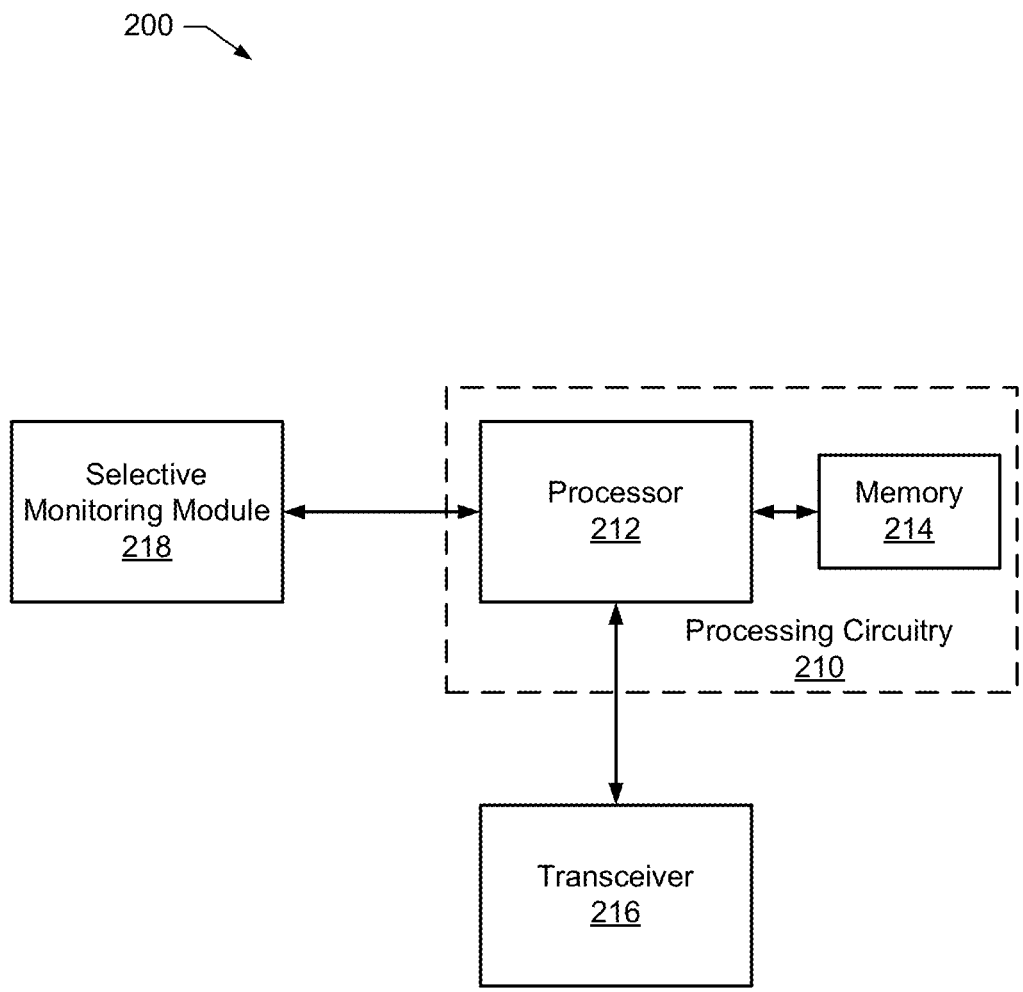
FIG. 2 illustrates a block diagram of an apparatus that can be implemented on a wireless communication device in accordance with some example embodiments.

FIG. 2 illustrates a block diagram of an apparatus 200 that can be implemented on a wireless communication device 102 in accordance with some example embodiments. In this regard, when implemented on a computing device, apparatus 200 can enable the computing device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the wireless communication device 102 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a single chip or chipset. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a chipset, such as a cellular baseband chipset, configured to enable a computing device to operate over one or more cellular networks.

In some example embodiments, the processing circuitry 210 can include a processor 212 and, in some embodiments, such as that illustrated in FIG. 2, can further include memory 214. The processing circuitry 210 can be in communication with or otherwise control transceiver 216 and/or selective monitoring module 218.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of a wireless communication device as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transceiver 216, or selective monitoring module 218 via one or more buses for passing information among components of the apparatus 200.

The apparatus 200 can further include transceiver 216. The transceiver 216 can enable the apparatus 200 to send wireless signals to and receive signals from one or more cellular networks. As such, the transceiver 216 can be configured to support any type of RAT that may be implemented by the serving base station 104, and can enable uplink and downlink communication with the serving base station 104.

The apparatus 200 can further include selective monitoring module 218. The selective monitoring module 218 can be embodied as various means, such as circuitry, hardware, a computer program product comprising computer readable program instructions stored on a computer readable medium (for example, the memory 214) and executed by a processing device (for example, the processor 212), or some combination thereof. In some embodiments, the processor 212 (or the processing circuitry 210) can include, or otherwise control the selective monitoring module 218. The selective monitoring module 218 can be configured to selectively monitor uplink transmission opportunities following receipt of an ACK for an uplink transmission in accordance with one or more example embodiments, as described further herein below with respect to FIGS. 3-7.

In some instances, wireless communication device 102 can be in a connected mode and receive a connected mode DRX configuration from the serving base station 104. The DRX configuration can specify one or more parameters for the DRX configuration. For example, the DRX configuration can specify an On Duration Timer, drx-InactivtyTimer, DRX cycle length, drx-RetransmissionTimer, and/or other parameters that can be used to define a DRX configuration for a wireless communication device, such as wireless communication device 102. The wireless communication device 102 can send UL transmissions to the serving base station 104 during a DRX cycle in accordance with the configuration, and can implement a HARQ protocol and/or other retransmission process to support retransmissions, as may be requested by the serving network.

Figure 3:
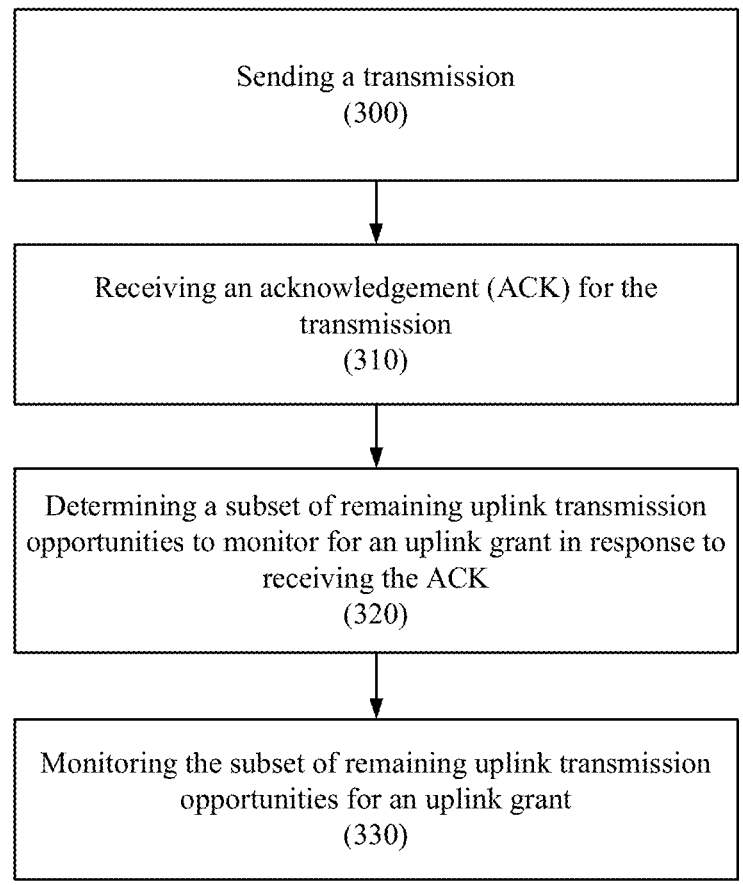
FIG. 3 illustrates a flowchart according to an example method for reducing power consumption in connected mode DRX in accordance with some example embodiments.

Referring now to FIG. 3, FIG. 3 illustrates a flowchart according to an example method for reducing power consumption in connected mode DRX in accordance with some example embodiments. In this regard, FIG. 3 illustrates an example method in which power consumption in connected mode DRX can be reduced by limiting and/or reducing a number of monitored uplink retransmission opportunities. The operations illustrated in and described with respect to FIG. 3 can be performed by a wireless communication device, such as wireless communication device 102, in accordance with various example embodiments. One or more of processing circuitry 210, processor 212, memory 214, transceiver 216, or selective monitoring module 218 can, for example, provide means for performing the operations illustrated in and described with respect to FIG. 3.

Operation 300 can include the wireless communication device 102 sending an UL transmission. The UL transmission can be sent during an UL transmission time interval (TTI), such as can be scheduled by the serving base station 104. The UL transmission can be an initial transmission, or can be a retransmission of data (e.g., in accordance with a retransmission process) if a previous transmission attempt was unsuccessful. For example, if the wireless communication device 102 implements a HARQ retransmission process in response to a request for retransmission by the serving network, the transmission can comprise retransmission of data that can be maintained in a HARQ buffer. Operation 310 can include the wireless communication device 102 receiving an ACK for the transmission of operation 310.

Operation 320 can include the wireless communication device 102 determining a subset of remaining uplink transmission opportunities to monitor for an uplink grant in response to receiving the ACK. The uplink transmission opportunities can be time slots for which the wireless communication device 102 can receive an uplink grant from the serving base station 104 to retransmit the transmission of operation 300 (e.g., if the transmission was not successfully received by the serving base station 104. Thus, for example, if the ACK received in operation 310 was actually a NACK that was misinterpreted by the wireless communication device 102 or the serving network sent a NACK for purposes of congestion control rather than to acknowledge receipt of the transmission, the serving base station 104 can later send a NACK and an uplink grant to the wireless communication device 102 for retransmission of the transmission within an uplink transmission opportunity.

The subset of uplink transmission opportunities that can be determined in operation 320 can comprise a number of uplink transmission opportunities ranging from 0 to a maximum equivalent to a number of remaining uplink transmission opportunities in a HARQ retransmission process and/or other retransmission process that can be implemented by the wireless communication device 102. Thus, for example, if the wireless communication device 102 implements a HARQ retransmission process, the subset of uplink transmission opportunities can comprise a number of uplink transmission opportunities that can be defined as:

$$0 \leq \text{number of uplink transmission opportunities in the subset of remaining uplink transmission opportunities} \leq \text{number of remaining uplink transmission opportunities in the pending HARQ retransmission process.}$$

The number of remaining uplink transmission opportunities in the pending HARQ retransmission process (e.g., the maximum number of possible transmission opportunities that can be included in the determined subset of remaining uplink transmission opportunities) can, for example, be calculated as:

$$\text{maximum number of possible transmission opportunities} = (\text{Max Number of Transmissions}) - 1 - \text{Current Transmission Number} \quad [2]$$

The "Current Transmission Number" can be a transmission number associated with the transmission of operation 300 in embodiments in which transmissions in a retransmission process are numbered consecutively beginning with 0. Thus, for example, given a network configuration for the maximum number of HARQ transmission opportunities of 4, as described above, if the transmission of operation 300 is a first HARQ transmission for a HARQ retransmission process, the Current Transmission Number can be 0 and the maximum number of possible transmission opportunities that can be included in the determined subset can be calculated using equation [2] as:

$$4-1-0=3.$$

The selected subset of remaining uplink transmission opportunities can comprise 0 or more consecutive uplink transmission opportunities following the transmission of operation 300. Thus, for example, if the selected subset of remaining uplink transmission opportunities comprises N uplink transmission opportunities, the N uplink transmission opportunities can be the next N uplink transmission opportunities such that, if there are any further remaining uplink transmission opportunities following the N uplink transmission opportunities, the wireless communication device 102 can, in some instances as described further below, enter a sleep state for the further remaining uplink transmission opportunities.

In some example embodiments, a static preconfigured number of uplink transmission opportunities to monitor can be selected in operation 320. For example, a static number of 1 can be configured in some example embodiments. In this regard, wireless communication device 102 of such example embodiments can be configured to monitor a static configured number of uplink transmission opportunities to verify that the ACK received in operation 310 was not misinterpreted by the wireless communication device 102 and that the serving base station 104 did not send an ACK for scheduling reasons.

Additionally or alternatively, in some example embodiments, the subset of remaining uplink transmission opportunities that the wireless communication device 102 can determine to monitor can be dynamically selected based at least in part on one or more channel conditions (e.g., radio frequency channel conditions) of the serving network. In this regard, the wireless communication device 102 of such example embodiments can be configured to select to monitor more uplink transmission opportunities in poor channel conditions than if channel conditions are good. For example, if a channel condition is worse than a threshold channel condition, the wireless communication device 102 can be configured to select to monitor a greater number of remaining uplink transmission opportunities than if the channel condition is not worse than the threshold channel condition.

In some example embodiments, there wireless communication device 102 can apply multiple threshold channel conditions. For example there can be a first threshold channel condition and a second threshold channel condition, with the second threshold channel condition representing a worse channel condition than the first threshold channel condition. If an observed channel condition satisfies the first threshold channel condition (e.g., is not worse than the first threshold channel condition), the wireless communication device 102 can, for example, select to monitor N uplink transmission opportunities, where N is an integer value$\geq 0$. If the observed channel condition fails to satisfy the first threshold channel condition (e.g., is worse than the first threshold channel condition), but satisfies the second threshold channel condition, the wireless communication device 102 can, for example, select to monitor N+1 uplink transmission opportunities. If, the observed channel condition fails to satisfy either the first threshold channel condition or the second threshold channel condition, the wireless communication device 102 can, for example, select to monitor N+2 uplink transmission opportunities.

As a more particular example of a channel condition that can be used to determine the subset of remaining uplink transmission opportunities to monitor, the wireless communication device 102 can be configured to determine a signal quality of the serving base station 104 and use the signal quality to determine the subset of remaining uplink transmission opportunities to monitor. By way of non-limiting example, a signal quality that can be used to determine the subset of remaining uplink transmission opportunities to monitor can include a downlink (DL) signal to interference plus noise ratio (SINR), a DL signal to noise ratio (SNR), a reference signal received power (RSRP), a reference signal received quality (RSRQ), a received signal strength indicator (RSSI), available power headroom (PHR), and/or other measurement of a signal quality that can be associated with the serving base station 104. The wireless communication device 102 can, for example, select to monitor more uplink transmission opportunities after receiving the ACK in poor signal quality conditions than in good signal quality conditions.

A further example of a channel condition that can be used by the wireless communication device 102 can use to determine the subset of remaining uplink transmission opportunities to monitor is loading on the serving base station 104. In some example embodiments, if loading conditions of the serving base station 104 are observed to be heavily loaded, such as if the loading level on serving base station 104 is greater than a threshold loading level, then the wireless communication device 102 of some example embodiments can select to monitor more uplink transmission opportunities than in an instance in which the serving base station 104 is observed to be lightly loaded.

An addition example of a channel condition that can be used by the wireless communication device 102 is a derived indication of a channel condition based on an ongoing retransmission process (e.g., an ongoing HARQ retransmission process) and/or for one or more prior retransmission processes (e.g., one or more prior HARQ retransmission processes. For example, in some example embodiments, the wireless communication device 102 can consider a number (e.g., a maximum number, minimum number, average, and/or the like) of transmissions (e.g., a number of HARQ transmissions) required for successful data transmission in one or more prior retransmission processes. Channel conditions can be considered to be worse in instances in which a greater number of transmissions were required for a prior retransmission process(es) than if fewer transmissions were required. As a further example, in some example embodiments, the wireless communication device 102 can consider a measured reliability of one or more previously received ACKs, such as a reliability one or more previously received Physical HARQ Indicator Channel (PHICH) ACKs, and/or a measured reliability of one or more previously received NACKs, such as a reliability of one or more previously received PHICH NACKs. In this regard, if a large number (e.g., more than a threshold number and/or more than a threshold percentage) of previously received ACKs/NACKs were inaccurately received and/or interpreted, such as if an ACK sent by the serving base station 104 was received and/or interpreted by the wireless communication device 102 as a NACK and/or vice versa, then channel conditions can be considered to be poor such that the wireless communication device 102 can select to monitor more uplink transmission opportunities than if channel conditions are observed to be good.

An example method for determining the subset of remaining uplink transmission opportunities to monitor based at least in part on a channel condition that can be used by the wireless communication device 102 of some example embodiments to perform operation 320 is illustrated in and described below with respect to FIG. 6.

In some example embodiments, such as that illustrated in and described further herein below with respect to FIG. 7, the wireless communication device 102 can be configured to monitor a static, preconfigured number of uplink transmission opportunities (e.g., 1) following receipt of an ACK in an instance in which channel conditions are observed to be relatively good, but can dynamically select a number of uplink transmission opportunities to monitor that can be greater than the static, preconfigured number in an instance in which channel conditions are observed to be poor. Accordingly, in some embodiments, operation 320 can include determining whether to select a static number of uplink transmission opportunities to monitor or to dynamically select a number of uplink transmission opportunities based on channel conditions.

Operation 330 can include the wireless communication device 102 monitoring the selected subset of remaining uplink transmission opportunities. In some instances, wireless communication device 102 can enter a sleep state for any uplink transmission opportunities remaining after monitoring the selected subset of uplink transmission opportunities so as to conserve power. For example, if an uplink grant for retransmission of the data transmitted in operation 300 is not received for any of the subset of remaining uplink transmission opportunities monitored in operation 330, the wireless communication device 102 of some example embodiments can enter a sleep state for any remaining uplink transmission opportunities. In some embodiments, the wireless communication device 102 can continue in the sleep state until the end of the DRX cycle.

In some example embodiments, the wireless communication device 102 can be configured to discern between an ACK sent due to a measurement gap, such as an ACK reception scheduled for a measurement gap as described in 3GPP TS 36.321, Section 5.4.2.2, and a genuine ACK feedback for the transmission of operation 300. In this regard, in some example embodiments, if an ACK sent due to a measurement gap is received, it can be ignored and will not be considered in determining a number of uplink transmission opportunities to monitor.

Figure 4:
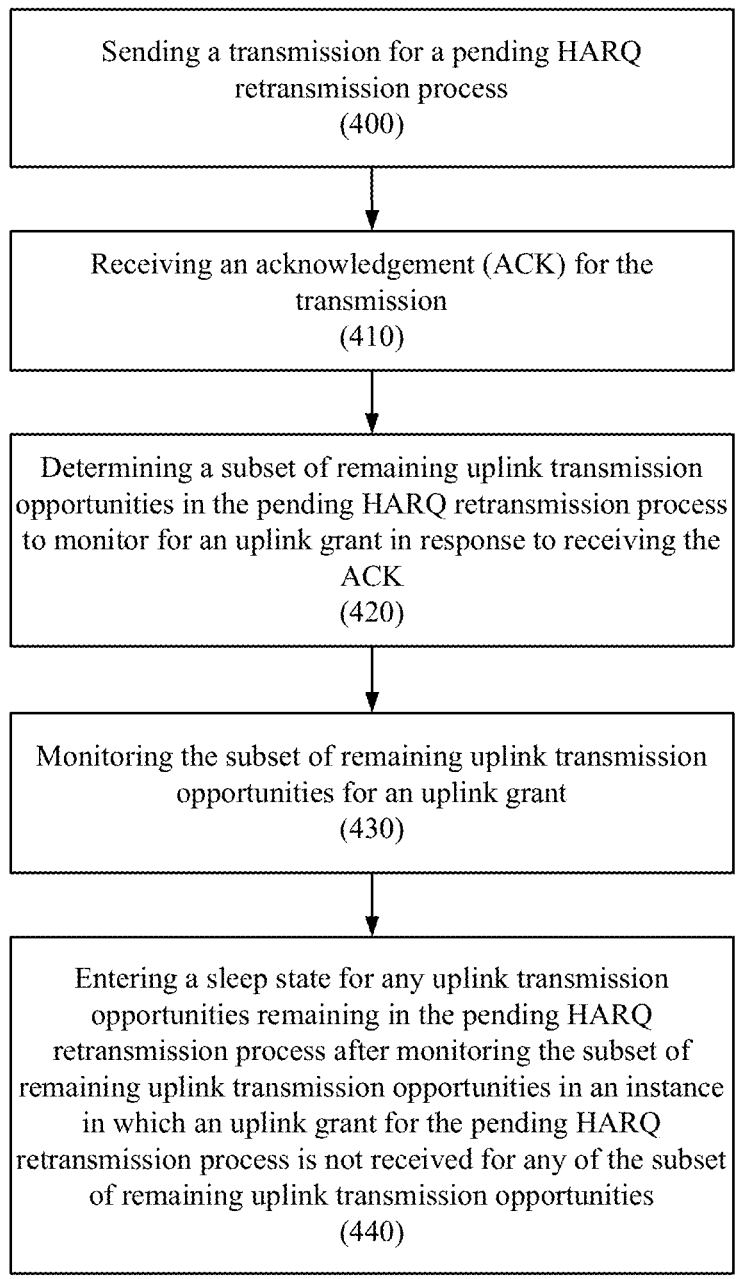
FIG. 4 illustrates a flowchart according to a further example method for reducing power consumption in connected mode DRX in accordance with some example embodiments.

FIG. 4 illustrates a flowchart according to a further example method for reducing power consumption in connected mode DRX in accordance with some example embodiments. More particularly, FIG. 4 illustrates an embodiment of the method of FIG. 3 in which the method can be applied to performance of a HARQ retransmission process while in connected mode DRX. One or more of processing circuitry 210, processor 212, memory 214, transceiver 216, or selective monitoring module 218 can, for example, provide means for performing the operations illustrated in and described with respect to FIG. 4.

Operation 400 can comprise the wireless communication device 102 sending a transmission for a pending HARQ retransmission process. In this regard, operation 400 can correspond to an embodiment of operation 300 in which the transmission is a transmission (e.g., a retransmission of data which was not successfully sent on a previous attempt) for a HARQ retransmission process. Operation 410 can comprise the wireless communication device 102 receiving an ACK for the transmission of operation 400.

Operation 420 can comprise the wireless communication device 102 determining a subset of remaining uplink transmission opportunities in the pending HARQ retransmission process to monitor for an uplink grant in response to receiving the ACK. In this regard, operation 420 can, for example, correspond to an embodiment of operation 320.

Operation 430 can comprise the wireless communication device 102 monitoring the subset of remaining uplink transmission opportunities for an uplink grant. Operation 430 can accordingly correspond to an embodiment of operation 330.

In an instance in which an uplink grant for the pending HARQ retransmission process is not received for any of the subset of remaining uplink transmission opportunities monitored in operation 430, the method can further comprise operation 440. In this regard, operation 440 can comprise the wireless communication device 102 entering a sleep state for any uplink transmission opportunities remaining in the pending HARQ retransmission process after monitoring the subset of remaining uplink transmission opportunities.

However, if a grant, such as in the form of a NACK or an explicit uplink grant for retransmission of the data is received for a monitored uplink transmission opportunity, operation 440 can be omitted and the wireless communication device 102 can perform a further HARQ retransmission. If an ACK is received for the further HARQ retransmission and there is still one or more remaining uplink transmission opportunities in the pending HARQ retransmission process, the wireless communication device 102 can again perform one or more of operations 420-430.

Figure 5:
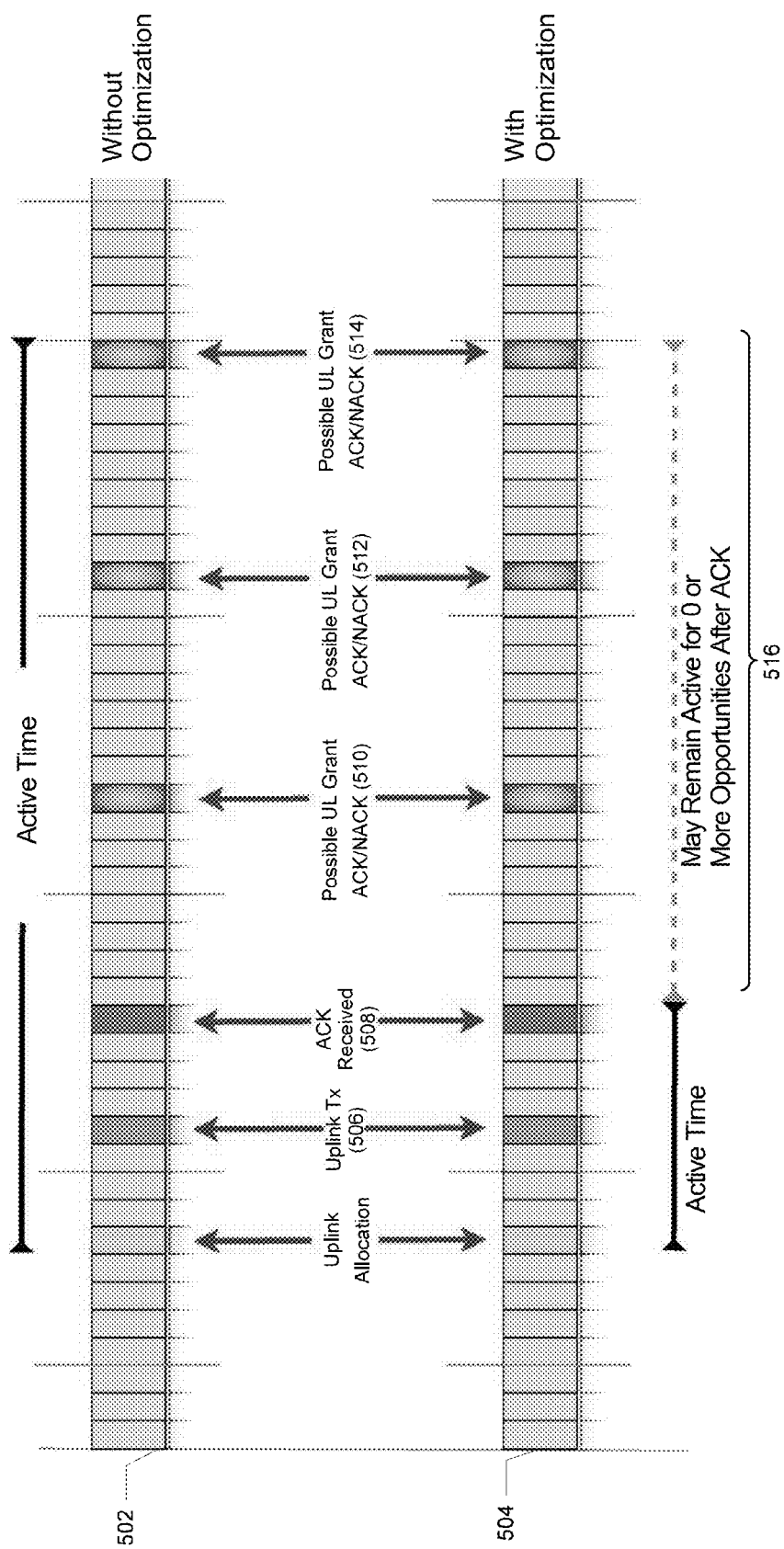
FIG. 5 illustrates an example of additional sleep state time that can be gained through application of some example embodiments.

FIG. 5 illustrates an example of additional sleep state time that can be gained through application of some example embodiments to limit a number of monitored uplink transmission opportunities when operating in connected mode DRX. Two possible timelines are illustrated in FIG. 5. The first is timeline 502, which illustrates a prior approach, in which a device monitors every possible uplink transmission opportunity following receipt of an ACK and remains in active time for the duration of the remaining uplink transmission opportunities after receiving the ACK. The second is timeline 504, which illustrates an example application of some example embodiments in which after receipt of an ACK, the wireless communication device 102 can remain active for 0 or more further uplink transmission opportunities, and can enter a sleep state for any remaining uplink transmission opportunities that are not monitored.

As illustrated in the example of FIG. 5, a device can send an uplink transmission at slot 506, and can receive an ACK at slot 508. In the timeline 502 in which an optimization in accordance with various example embodiments is not applied, device would continue to monitor each of the remaining uplink grant ACK/NACK timeslots 510, 512, and 514, and would remain in active time for the duration of this period. However, in accordance with the timeline 504 in accordance with some example embodiments, wireless communication device 102 can selectively monitor a subset of the possible uplink grant ACK/NACK timeslots 510, 512, and 514 (e.g., 0 or more of the timeslots), and can enter a sleep state for any time slots not monitored. Accordingly, whereas the device would remain in active time for the entire duration of time period 516 in the timeline 502 in which optimization is not applied, the device can enter a sleep state for at least a portion of the time period 516 as illustrated in the timeline 504 through application of some example embodiments in which the device can selectively monitor only a subset of the timeslots 510, 512, and 514.

Figure 6:
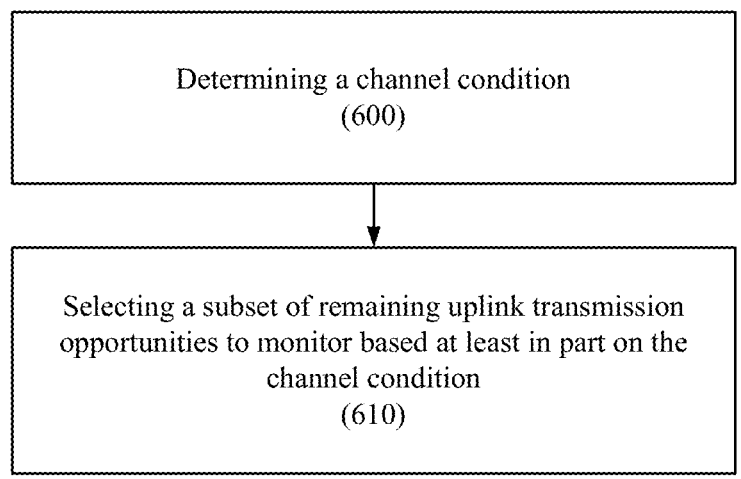
FIG. 6 illustrates a flowchart of an example method for dynamically selecting uplink transmission opportunities to monitor based on an a channel condition in accordance with some example embodiments.

FIG. 6 illustrates a flowchart of an example method for dynamically selecting uplink transmission opportunities to monitor based at least in part on an a channel condition in accordance with some example embodiments. In this regard, FIG. 6 illustrates an example method that can be used by wireless communication device 102 to perform operation 320 and/or operation 420 in accordance with some example embodiments in which the subset of remaining uplink transmission opportunities can be dynamically selected based at least in part on a channel condition. One or more of processing circuitry 210, processor 212, memory 214, transceiver 216, or selective monitoring module 218 can, for example, provide means for performing the operations illustrated in and described with respect to FIG. 6.

Operation 600 can comprise the wireless communication device 102 determining a channel condition. The channel condition can include any channel condition or combination of channel conditions that can be measured, observed, and/or derived by the wireless communication device 102 and that can be indicative of a channel condition associated with a connection between the wireless communication device 102 and the serving base station 104. By way of non-limiting example, operation 600 can comprise determining any one or more of the channel conditions discussed above with respect to operation 320.

Operation 610 can comprise the wireless communication device 102 selecting a subset of remaining uplink transmission opportunities to monitor based at least in part on the channel condition. For example, the wireless communication device 102 of can be configured to select to monitor more uplink transmission opportunities in poor channel conditions than if channel conditions are good. In some example embodiments, operation 610 can include comparing the determined channel condition to one or more threshold channel conditions. If the determined channel condition is worse than a threshold channel condition, the wireless communication device 102 can be configured to select to monitor a greater number of remaining uplink transmission opportunities than if the channel condition is not worse than the threshold channel condition. The subset of remaining uplink transmission opportunities that can be selected in accordance with operation 610 can, for example, comprise the subset of remaining uplink transmission opportunities that can be monitored in operation 330 and/or operation 430.

Figure 7:
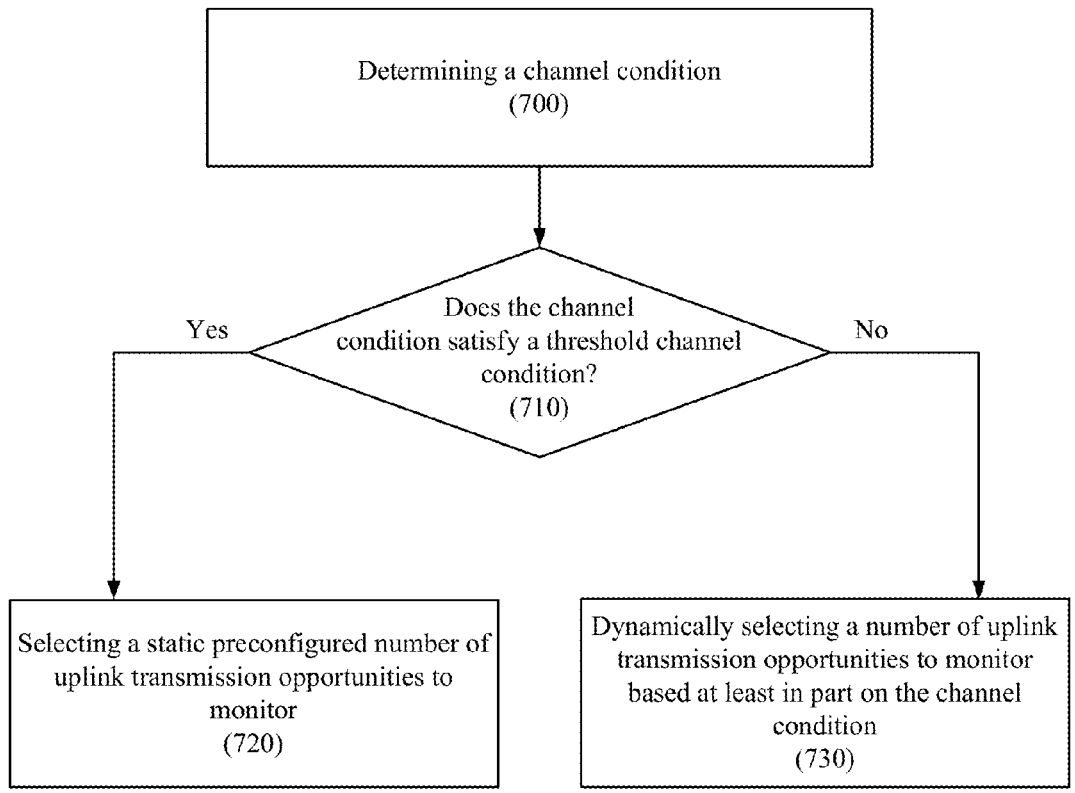
FIG. 7 illustrates a flowchart of an example method for selecting uplink transmission opportunities to monitor in accordance with some example embodiments.

FIG. 7 illustrates a flowchart of an example method for selecting uplink transmission opportunities to monitor in accordance with some example embodiments. In this regard, FIG. 7 illustrates an example method that can be used by wireless communication device 102 to perform operation 320 and/or operation 420 in accordance with some example embodiments in which the wireless communication device 102 can be configured to determine whether to statically or dynamically select the number of remaining uplink transmission opportunities to monitor based at least in part on a channel condition. One or more of processing circuitry 210, processor 212, memory 214, transceiver 216, or selective monitoring module 218 can, for example, provide means for performing the operations illustrated in and described with respect to FIG. 7.

Operation 700 can comprise the wireless communication device 102 determining a channel condition. The channel condition can include any channel condition or combination of channel conditions that can be measured, observed, and/or derived by the wireless communication device 102 and that can be indicative of a channel condition associated with a connection between the wireless communication device 102 and the serving base station 104. By way of non-limiting example, operation 700 can comprise determining any one or more of the channel conditions discussed above with respect to operation 320.

Operation 710 can comprise the wireless communication device 102 determining whether the channel condition satisfies a threshold channel condition. For example, operation 710 can include determining whether the channel condition is worse than the threshold channel condition.

If it is determined in operation 710 that the channel condition satisfies the threshold channel condition (e.g., if the channel condition is not worse than the threshold channel condition), the method can proceed to operation 720. Operation 720 can comprise the wireless communication device 102 selecting a static preconfigured number of uplink transmission opportunities to monitor. In this regard, the static preconfigured number can be a default number of uplink transmission opportunities (e.g., 0 or more depending on configuration) that can be monitored unless the channel condition is worse than the threshold channel condition.

If, however, it is determined in operation 710 that the channel condition does not satisfy the threshold channel condition (e.g., if the channel condition is worse than the threshold channel condition), the method can instead proceed to operation 730. Operation 730 can comprise the wireless communication device 102 dynamically selecting a number of uplink transmission opportunities to monitor based at least in part on the channel condition. The dynamically selected number can be greater than the static preconfigured number that can be selected in operation 720. In some embodiments, operation 730 can comprise applying one or more threshold channel conditions (e.g., in addition to the threshold channel condition that can be applied in operation 710) to facilitate dynamic selection of the number of uplink transmission opportunities to monitor. In this regard, if the determined channel condition is worse than a threshold channel condition, the wireless communication device 102 can be configured to select to monitor a greater number of remaining uplink transmission opportunities than if the channel condition is not worse than the threshold channel condition. Accordingly, the worse the channel condition, the greater the number of uplink transmission opportunities that the wireless communication device 102 can select to monitor in operation 730.

It will be appreciated that embodiments described herein with respect to a particular RAT(s), such as LTE, and/or with respect to particular retransmission processes, such as HARQ, are provided by way of example and not by way of limitation. In this regard, it will be appreciated that embodiments and techniques described within the context of examples using LTE and/or HARQ can be applied mutatis mutandis to other RATs and/or other retransmission processes. Similarly, it will be appreciated that techniques and embodiments described herein with respect to connected mode DRX operation can be applied mutatis mutandis to other configurations and/or techniques enabling a wireless communication device to at least temporarily enter a reduced power sleep state while in connected mode.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for reducing power consumption by a wireless communication device operating in connected mode discontinuous reception (DRX) on a Long Term Evolution (LTE) network, the method comprising the wireless communication device:
    sending a transmission for a pending hybrid automatic repeat request (HARQ) retransmission process;
    receiving an acknowledgement (ACK) for the transmission;
    determining an observed radio frequency channel condition associated with a connection between the wireless communication device and a base station;
    determining, based on a comparison of the observed radio frequency channel condition with a threshold channel condition, a subset of remaining uplink transmission opportunities in the pending HARQ retransmission process to monitor for an uplink grant in response to receiving the ACK;
    monitoring the subset of remaining uplink transmission opportunities for the uplink grant; and
    entering a sleep state for any uplink transmission opportunities remaining in the pending HARQ retransmission process after monitoring the subset of remaining uplink transmission opportunities in an instance in which no uplink grant for the pending HARQ retransmission process is received for any of the subset of remaining uplink transmission opportunities.

2. The method of claim 1, wherein the subset of remaining uplink transmission opportunities comprises a number of uplink transmission opportunities having a value defined as:
    $0 \leq$ number of uplink transmission opportunities in the subset of remaining uplink transmission opportunities $\leq$ number of remaining uplink transmission opportunities in the pending HARQ retransmission process.

3. The method of claim 1, wherein determining the subset of remaining uplink transmission opportunities comprises selecting a static preconfigured number of uplink transmission opportunities to monitor.

4. The method of claim 1, wherein when the observed radio frequency channel condition is worse than the threshold channel condition, a greater number of uplink transmission opportunities are monitored than when the observed radio frequency channel condition is not worse than the threshold channel condition.

5. The method of claim 1, wherein the observed radio frequency channel condition comprises one or more of a signal to interference plus noise ratio (SINR), a signal to noise ratio, a reference signal received power (RSRP), a reference signal received quality (RSRQ), a received signal strength indicator (RSSI), available power headroom (PHR), a number of transmissions in an ongoing retransmission process or a number of transmissions required for successful transmission in a prior retransmission process.

6. The method of claim 1, wherein the observed radio frequency channel condition comprises one or more of a number of HARQ transmissions required for successful transmission in one or more previous HARQ retransmission processes, a measured reliability of one or more previously received ACKs for one or more prior HARQ transmissions, or a measured reliability of one or more previously received negative-acknowledgements (NACKs) for one or more prior HARQ transmissions.

7. The method of claim 1,
wherein determining the subset of remaining uplink transmission opportunities comprises:
selecting a static preconfigured number of uplink transmission opportunities to monitor in an instance in which it is determined that the observed radio frequency channel condition satisfies the threshold channel condition; and
dynamically selecting a number of uplink transmission opportunities to monitor based at least in part on the observed radio frequency channel condition in an instance in which it is determined that the observed radio frequency channel condition does not satisfy the threshold channel condition, wherein the dynamically selected number of uplink transmission opportunities is greater than the static preconfigured number of uplink transmission opportunities.

8. A wireless communication device comprising:
a transceiver configured to send wireless signals to and receive wireless signals from a serving network; and
processing circuitry coupled with the at least one transceiver, wherein the processing circuitry is configured to cause the wireless communication device to at least:
operate in connected mode discontinuous reception (DRX) on the serving network;
send a transmission for a pending hybrid automatic repeat request (HARQ) retransmission process while operating in connected mode DRX;
receive an acknowledgement (ACK) for the transmission;
determine an observed radio frequency channel condition associated with a connection between the wireless communication device and a base station;
determine, based on a comparison of the observed radio frequency channel condition with a threshold channel condition, a subset of remaining uplink transmission opportunities in the pending HARQ retransmission process to monitor for an uplink grant in response to receiving the ACK;
monitor the subset of remaining uplink transmission opportunities for the uplink grant; and
enter a sleep state for any uplink transmission opportunities remaining in the pending HARQ retransmission process after monitoring the subset of remaining uplink transmission opportunities in an instance in which no uplink grant for the pending HARQ retransmission process is received for any of the subset of remaining uplink transmission opportunities.

9. The wireless communication device of claim 8, wherein the subset of remaining uplink transmission opportunities comprises a number of uplink transmission opportunities having a value defined as:
$0 \leq$ number of uplink transmission opportunities in the subset of remaining uplink transmission opportunities $\leq$ number of remaining uplink transmission opportunities in the pending HARQ retransmission process.

10. The wireless communication device of claim 8, wherein the processing circuitry is further configured to cause the wireless communication device to determine the subset of remaining uplink transmission opportunities at least in part by causing the wireless communication device to select a static preconfigured number of uplink transmission opportunities to monitor.

11. The wireless communication device of claim 8, wherein when the observed radio frequency channel condition is worse than the threshold channel condition, a greater number of uplink transmission opportunities are monitored than when the observed radio frequency channel condition is not worse than the threshold channel condition.

12. The wireless communication device of claim 8, wherein the observed radio frequency channel condition comprises one or more of a signal to interference plus noise ratio (SINR), a signal to noise ratio (SNR), a reference signal received power (RSRP), a reference signal received quality (RSRQ), a received signal strength indicator (RSSI), available power headroom (PHR), a number of transmissions in an ongoing retransmission process or a number of transmissions required for successful transmission in a prior retransmission process.

13. The wireless communication device of claim 8, wherein the observed radio frequency channel condition comprises one or more of a number of HARQ transmissions required for successful transmission in one or more previous HARQ retransmission processes, a measured reliability of one or more previously received ACKs for one or more prior HARQ transmissions, or a measured reliability of one or more previously received negative-acknowledgements (NACKs) for one or more prior HARQ transmissions.

14. A non-transitory computer readable storage medium having computer program code stored thereon, the computer program code comprising program code, which, when executed by one or more processors implemented on a wireless communication device operating in connected mode discontinuous reception (DRX), is configured to cause the wireless communication device to perform a method comprising:
sending a transmission;
receiving an acknowledgement (ACK) for the transmission;
determining an observed radio frequency channel condition associated with a connection between the wireless communication device and a base station;
determining, based on a comparison of the observed radio frequency channel condition with a threshold channel condition, a subset of remaining uplink transmission opportunities to monitor for an uplink grant for retransmitting the transmission subsequent to receiving the ACK for the transmission;
monitoring the subset of remaining uplink transmission opportunities for the uplink grant; and
entering a sleep state after monitoring the subset of remaining uplink transmission opportunities in an instance in which no uplink grant is received for any of the subset of remaining uplink transmission opportunities.

15. The non-transitory computer readable storage medium of claim 14, wherein:
the transmission comprises a transmission for a pending hybrid automatic repeat request (HARQ) retransmission process; and
the remaining uplink transmission opportunities comprise remaining uplink transmission opportunities in the pending HARQ retransmission process.

16. The non-transitory computer readable storage medium of claim 14, wherein determining the subset of remaining uplink transmission opportunities comprises selecting a static preconfigured number of uplink transmission opportunities to monitor.

17. The non-transitory computer readable storage medium of claim 14, wherein when the observed radio frequency channel condition is worse than the threshold channel condition, a greater number of uplink transmission opportunities are monitored than when the observed radio frequency channel condition is not worse than the threshold channel condition.

18. The non-transitory computer readable storage medium of claim 14, wherein the observed radio frequency channel condition comprises one or more of a signal to interference plus noise ratio (SINR), a signal to noise ratio, a reference signal received power (RSRP), a reference signal received quality (RSRQ), a received signal strength indicator (RSSI), available power headroom (PHR), a number of transmissions in an ongoing retransmission process or a number of transmissions required for successful transmission in a prior retransmission process.

19. The non-transitory computer readable storage medium of claim 14, wherein the observed radio frequency channel condition comprises one or more of a number of HARQ transmissions required for successful transmission in one or more previous HARQ retransmission processes, a measured reliability of one or more previously received ACKs for one or more prior HARQ transmissions, or a measured reliability of one or more previously received negative-acknowledgements (NACKs) for one or more prior HARQ transmissions.

20. The non-transitory computer readable storage medium of claim 14, wherein determining the subset of remaining uplink transmission opportunities comprises:
selecting a static preconfigured number of uplink transmission opportunities to monitor in an instance in which it is determined that the observed radio frequency channel condition satisfies the threshold channel condition; and
dynamically selecting a number of uplink transmission opportunities to monitor based at least in part on the observed radio frequency channel condition in an instance in which it is determined that the observed radio frequency channel condition does not satisfy the threshold channel condition, wherein the dynamically selected number of uplink transmission opportunities is greater than the static preconfigured number of uplink transmission opportunities.

* * * * *